O. M. OTTE.
AUTOMOBILE LAMP.
APPLICATION FILED JAN. 4, 1918.
1,309,450.
Patented July 8, 1919.
2 SHEETS—SHEET 1.
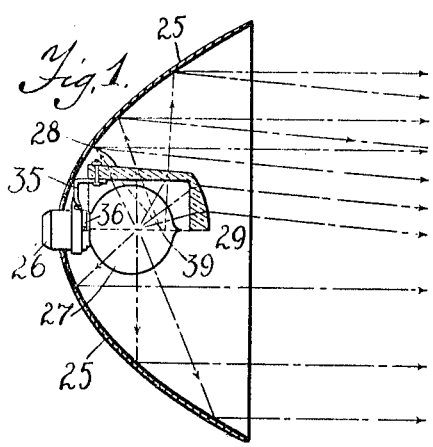
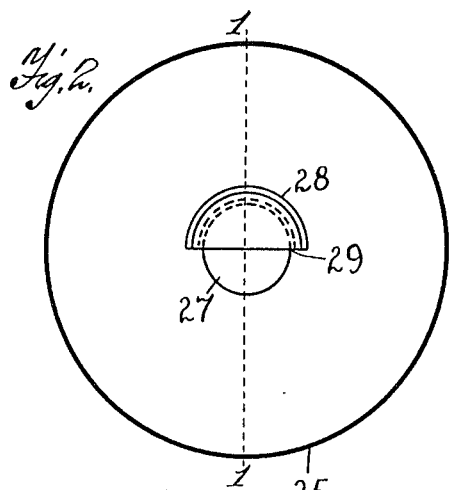
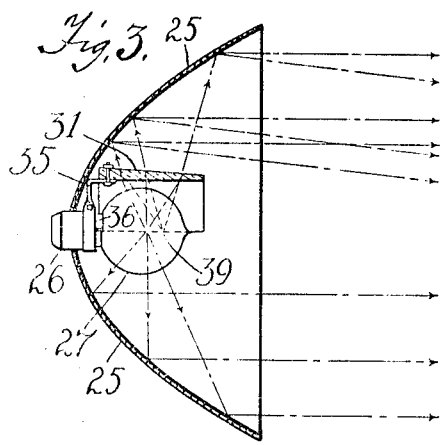
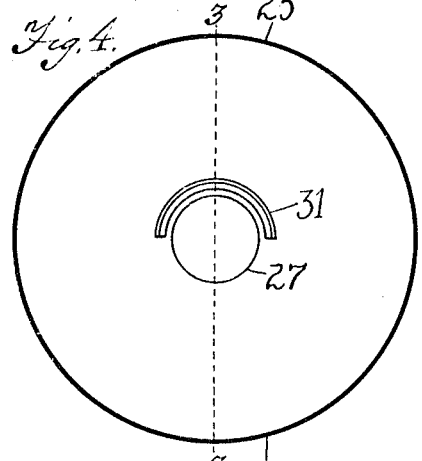
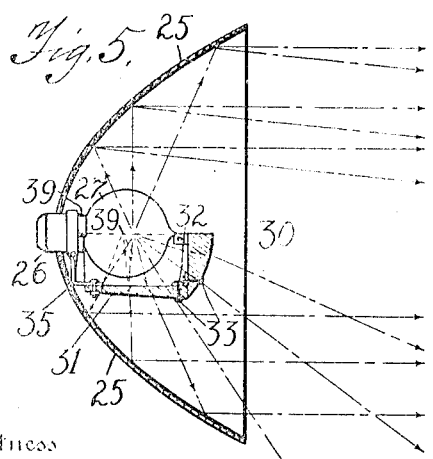
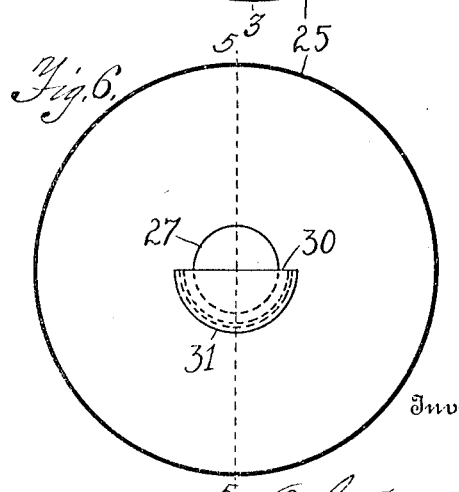
Witness
J. E. Nordstrom
H. A. Sandberg
Inventor
Otho M. Otte.
By S. Arthur Baldwin,
Attorney

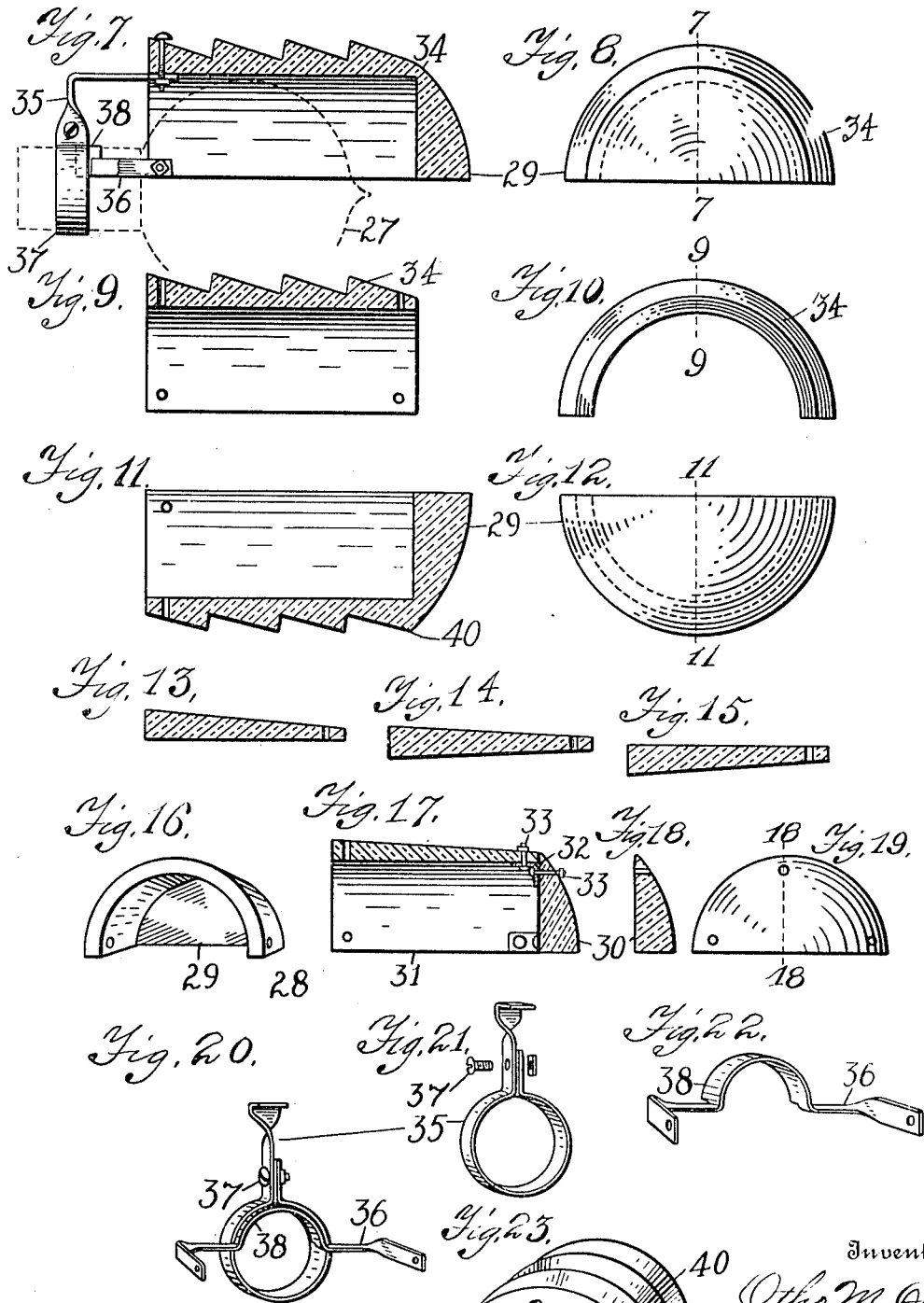

UNITED STATES PATENT OFFICE.

OTHO M. OTTE, OF JAMESTOWN, NEW YORK, ASSIGNOR TO RAYDEX MANUFACTURING COMPANY, OF BRACKENRIDGE, PENNSYLVANIA.

AUTOMOBILE-LAMP.

1,309,450.  Specification of Letters Patent.  Patented July 8, 1919.

Application filed January 4, 1918. Serial No. 210,240.

*To all whom it may concern:*

Be it known that I, OTHO M. OTTE, citizen of the United States, residing at the city of Jamestown, in the county of Chautauqua and State of New York, have invented certain new and useful Improvements in Automobile-Lamps, of which the following, taken in connection with the accompanying drawings, is a specification.

The invention relates to lamps for vehicles and similar uses in which mechanism is provided to project and control the light; and the object of the present improvement is to provide a lamp with a parabolic shaped reflector having means whereby a portion of the light is controlled by a refractory member which screens the light rays from the eyes of the passerby or bystander yet permits the use of a large per cent. of the light rays for lighting the immediate roadway in front of a vehicle, or for similar uses; and the invention consists in the novel features and combinations hereinafter set forth and claimed.

In the drawings, Figure 1 is a vertical sectional view at line 1—1 in Fig. 2 of an automobile head light showing the refracting medium or hood for the electric lamp which assists in directing the upper portion of the light rays so that they are reflected downward upon the roadway; and Fig. 2 is a front elevation of a parabolic reflector lamp with the semi-cylindrical refracting medium or hood over the upper portion of the electric lamp. Fig. 3 is a vertical sectional view at line 3—3 in Fig. 4 of an automobile head light having a parabolic reflector and showing a semi-cylindrical refracting medium or hood over the electric lamp, said refracting medium not having a front wall as in Figs. 1 and 2; and Fig. 4 is a front elevation of the same. Fig. 5 is a vertical sectional view at line 5—5 in Fig. 6 of an automobile head light having a parabolic reflector and the hood shaped refracting member turned to the under side of the electric lamp; and Fig. 6 is a front elevation of the same. Fig. 7 is a sectional view at line 7—7 in Fig. 8 of a modification of the semi-cylindrical shaped refracting hood for the electric light showing a series of toothed corrugations or prisms to reduce the weight of said refracting member and at the same time obtain stronger prismatic effect in the refraction of the light, the manner of supporting the refracting member on the light post being also shown; and Fig. 8 is a front elevation of the same; and Fig. 9 is a sectional view at line 9—9 in Fig. 10 of the modification shown in Fig. 7 without the front end wall; and Fig. 10 is a front elevation of the modification shown in Fig. 9. Fig. 11 is a sectional view at line 11—11 in Fig. 12 of the modification shown in Fig. 7 shaped and turned to hood the lower side of the light instead of the upper side; and Fig. 12 is a front elevation of the same. Figs. 13, 14 and 15 show lengthwise sectional views of the semi-cylindrical refractory member showing different degrees of thickness and shape, Fig. 13 showing a straight under side and an angular or inclined upper side, Fig. 14 showing both the upper and under sides inclined in the horizontal position, and Fig. 15 showing the horizontal upper side and an upwardly inclined under side. Fig. 16 is a perspective view of the rear end of the refractory hood shown in Fig. 1. Figs. 17 and 18 are vertical sectional views at line 18—18 in Fig. 19 of the modification of the hooded refractory member in which the front end wall is removable, Fig. 18 showing said end wall detached; and Fig. 19 is a front elevation of said front end wall. Fig. 20 is a perspective view of the metal bracket pieces for supporting the hooded refractory member on the lamp post; and Fig. 21 is a perspective view of the vertical supporting bracket piece; and Fig. 22 is a perspective view of the horizontal supporting bracket piece. Fig. 23 is a perspective view of the rigid or corrugated modified refracting member shown in Figs. 11–12.

Like characters of reference refer to corresponding parts in the several views.

The numeral 25 designates the parabolic reflector for a lamp for vehicles which may be either of the spot or head light type.

The reflector 25 has the lamp post 26 centrally supported therein, and the numeral 27 designates the electric lamp which is adjustably supported in the lamp post 26 so as to adjust the light backward and forward as to its position in relation to the parabolic reflector 10.

The numeral 28 designates the preferred form of the refracting medium which is made semi-cylindrical and has the front end wall 29, being preferably made in one piece, though it may be made in two pieces as shown in Figs. 5, 17, 18 and 19, the removable front end wall 30 being attached to the semi-cylindrical refractory member 31 by means of angle piece 32 and bolts 33, thus providing for the removal of the end piece 30 when desired. For certain uses the semi-cylindrical portion 31 is provided without the end piece 30 as shown in Figs. 3 and 4, and in order to better control the light it is some times desirable to ridge or corrugate the outer surface of the refractory member, as shown at 34 in Figs. 7–12 thereby lightening the refractory member and at the same time obtaining high refractory effects.

The refractory member is supported upon the light post 26 by means of the bracket pieces 35 and 36. The bracket piece 35 extends around the lamp post 26 and has the tightening screw bolt 37 which draws the end against the sides of the shank of the bracket piece 35 drawing it firmly around the lamp post 26. The bracket piece 36 has a central projecting sleeve portion 38 which fits within the loop of the bracket piece 35 so that as said loop is tightened around the lamp post 26 it firmly holds the horizontal bracket piece 36 in position. Each of the bracket pieces 35 and 36 have projecting arms with holes therethrough for attachment by means of suitable screw bolts through suitable holes in the semi-cylindrical refracting member 28, or in the modification 31 thereby holding said semi-cylindrical refracting member firmly in the horizontal position with the electric lamp 27 within the same. In order to change the position of the refracting member from the upper to the under side of the electric lamp 27 or to any position around the lamp post 26, it is only necessary to loosen the screw bolt 37 thereby permitting the turning of the refractory member and the two brackets 35 and 36 to the desired position in relation to the lamp 27.

The parabolic reflector 25 is substantially a true parabolic. In order to throw the light downward upon the roadway so as to throw it below the vision of an approaching driver in a vehicle the refractory hood 28 is placed above the lamp 27 as shown in Figs. 1–4 in which position the true focus of the parabolic reflector 25 would be at 39 but the refraction by the light by the refracting member 28 permits placing the light to the rear of said focus as shown in Figs. 1 and 3 whereby the angle of reflection from the parabolic reflector is changed downward as shown in dotted lines for the upper portion of the light. In Fig. 1 also the front end wall 29 refracts the upper portion of the direct rays downward into substantially parallel alinement with the refracted and reflected rays from the parabolic reflector. In Fig. 3 the removal of the front end wall 29 permits the direct rays to travel forth unobstructed.

When it is desired to place the hooded refracting member on the under side of the lamp 27, as shown in Figs. 5 and 6, the modified construction shown in Figs. 17, 18 and 19 is preferably used, the semi-cylindrical prism part 31 being changed so that the thicker end of the refracting prism is to the front instead of the rear, as shown in Fig. 17, and the lamp 27 with its light is forward of the foci 39 of the reflector 25 so that the light rays are refracted and reflected into parallel alinement from the parabolic reflector 25, the forward placing of the light 27 also reflects the upper portion of the light rays downward from the parabolic reflector 25.

It is apparent that the toothed or ridged construction 34 permits even greater control of the light rays by the hooded refracting member and at the same time lightens by reducing the amount of glass which it is necessary to use in said refracting member. It is also obvious that when made in two parts, as shown in Figs. 17, 18 and 19, whether of the straight prismatic semi-cylindrical design or of the ridged or toothed modified design said cylindrical prismatic portion 28 and 31 can be used either with the thin end forward or to the rear, according as it is desired to place the refracting hood above or below the light.

I claim as new:

1. In combination with a reflector and an incandescent lamp, a hood-like refractory member arranged to partly extend about the lamp, a bracket having a looped part between its ends extending around the post of the lamp and having an end thereof bent outwardly and secured to said hood-like member, a second bracket having a central arched portion engaged with the post of the lamp and within the loop of the first named bracket, said second bracket having its ends secured to the sides of the hood-like member, and a screw for securing the ends of the first named bracket together and to thereby secure the second named bracket in position.

2. In combination with a reflector and an incandescent lamp having a post, a refractory member arranged to partly extend about the lamp, a bracket secured to the top of the member and to the post, a second bracket independent of the first bracket secured to the sides of the member and engaged between the lamp post and the first named bracket, and means for securing the first named bracket in position and thereby to secure the second named bracket rigidly in position between the post and first bracket.

3. In combination with an incandescent lamp and the post thereof, a refractory member extending about the lamp, means to secure the member to the post, other means independent of the first named means for securing the member to the post at points spaced from the first named means, and means whereby to simultaneously and rigidly secure both of said means to the post.

4. In combination with an incandescent lamp and the post thereof, a hood-like refractory member extending about the lamp, a removable end for said member, and means to removably secure said end to the member.

5. In combination with an incandescent lamp, a hood-like refractory member arranged about the lamp, means to support the top of the member from the lamp, means independent of the first named means to support the opposite sides of the member from the lamp, and means to jointly secure both of said means in fixed position on the lamp.

6. In combination with a reflector and an electric lamp, a hood-like refractory member, said member being of tapering thickness in longitudinal section and having an end wall of tapering thickness in longitudinal section.

In testimony whereof I have affixed my signature in the presence of two witnesses.

OTHO M. OTTE.

Witnesses:
H. A. SANDBERG,
I. E. NORDSTROM.